United States Patent
Koh et al.

(10) Patent No.: US 7,498,555 B2
(45) Date of Patent: Mar. 3, 2009

(54) IMAGE SENSOR WITH IMPROVED SUB-SAMPLING

(75) Inventors: Kyoung-Min Koh, Hwaseong-Si (KR); Kwang-Ho Yoon, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 11/481,712

(22) Filed: Jul. 6, 2006

(65) Prior Publication Data
US 2007/0018072 A1      Jan. 25, 2007

(30) Foreign Application Priority Data
Jul. 6, 2005    (KR) .................. 10-2005-0060794

(51) Int. Cl.
*H01L 27/00* (2006.01)
(52) U.S. Cl. .................. 250/208.1; 348/308
(58) Field of Classification Search ............ 250/208.1, 250/214 R; 348/294, 304, 308
See application file for complete search history.

(56) References Cited

U.S. PATENT DOCUMENTS 7,238,925 B2 *   7/2007   Purcell et al. ............ 250/208.1

OTHER PUBLICATIONS

Korean Patent Application No. 1019990041186 to Yang et al., having Publication date of Apr. 25, 2000 (w/English Abstract page).
Korean Patent Application No. 1020010014594 to Tomohiro, having Publication date of Oct. 26, 2001 (w/English Abstract page).
Japanese Patent Application No. 09-088206 to Takayuki, having Publication date of Oct. 23, 1998 (w/English Abstract page).

* cited by examiner

*Primary Examiner*—Kevin Pyo
(74) *Attorney, Agent, or Firm*—Monica H. Choi

(57) ABSTRACT

An image sensor includes first and second pixel circuits and an output node coupled to the first and second pixel circuits. A bias circuit provides a higher bias current at the output node during a sub-sampling mode of operation of the image sensor for improved image quality.

20 Claims, 6 Drawing Sheets

IMAGE SENSOR WITH IMPROVED SUB-SAMPLING

BACKGROUND OF THE INVENTION

This application claims priority to Korean Patent Application No. 2005-60794, filed on Jul. 6, 2005 in the Korean Intellectual Property Office, the disclosure of which is incorporated herein in its entirety by reference.

FIELD OF THE INVENTION

The present invention relates generally to image sensors, and more particularly, to a mechanism for improving sub-sampling in a CMOS image sensor.

DESCRIPTION OF THE RELATED ART

A CMOS (complementary metal oxide semiconductor) image sensor is commonly mounted in cellular phones, digital still cameras, and other portable electronic devices. The CMOS image sensor captures a viewed image and converts the image into electrical signals which in turn are converted into digital signals. The digital image signals output from the CMOS image sensor form RGB (red green blue) color image data. The digital image signals are processed to drive a display device such as a liquid crystal display (LCD).

FIG. 1 is a block diagram of a conventional CMOS image sensor 100. Referring to FIG. 1, the image sensor 100 includes an active pixel sensor (APS) array 110, a row driver 120, and an analog-to-digital converter (ADC) 130.

The row driver 120 receives a control signal from a row decoder (not shown), and the analog-to-digital converter 130 receives a control signal from a column decoder (not shown). In addition, the image sensor 100 includes a controller (not shown) that generates timing control signals and addressing signals for selecting pixels that output sensed image signals.

FIG. 2 illustrates a color filter pattern of the APS array 110 of FIG. 1. The APS array 110 has a plurality of color filters disposed on the pixels such that each pixel receives light of a specific color. An example color filter array has the Bayer pattern in which blue and green alternate in a row or a column, and red and green alternate in the next row or column, as illustrated in FIG. 2.

Here, green which is closely related to a luminance signal alternates with red or blue in each row to improve luminance resolution. To enhance resolution, a CMOS image sensor having more than a million pixels is used in many electronic devices such as digital still cameras.

The APS array 110 of FIG. 1 senses light using photodiodes and converts the sensed light into electrical signals to generate image signals. The image signals output from the APS array 110 include red, green, and blue analog signals. The analog-to-digital converter 130 receives and converts the analog image signals from the pixel array 110 into digital image signals. The analog-to-digital converter 130 converts the image signals sensed by the photodiodes using correlated double sampling (CDS), which is well known in the art.

FIG. 3 is a circuit diagram of a unit pixel driving circuit 300 formed for each pixel of the APS array 110 of FIG. 1. Referring to FIG. 3, the unit pixel driving circuit 300 includes a photodiode PD and four transistors. In addition, the unit pixel driving circuit 300 includes a bias circuit 310 coupled to an output node VRST/VSIG. The bias circuit 310 is disposed at the top or bottom of each column of the APS array 110.

In CDS analog-to-digital conversion, a signal at a floating diffusion (FD) node as transmitted from a power supply voltage VDD is output as a reset signal VRST when a reset control signal RX (and a row select signal SEL) is activated. In addition, an electrical signal generated at the photodiode PD upon detection of incident light is transferred to the FD node and is output as an image signal VSIG when a transfer control signal TX (and the row select signal SEL) is activated. The ADC 130 converts a difference between the reset signal VRST and the image signal VSIG from an analog signal into a digital signal. The row select signal SEL, the reset control signal RX, and the transfer control signal TX may be generated by the row driver 120.

The image sensor 100 used in cellular phones or digital still cameras operates in a sub-sampling mode with reduced vertical resolution but without changed driving frequency to output a full frame image signal. The sub-sampling mode of operation is typically for rapid signal processing when high-resolution display is not desired, such as for a preview step for confirming an image to be captured or for an auto focusing step.

For the general sub-sampling mode of operation, image signals from intervals of rows or columns are sampled (i.e., output to the ADC 130) to reduce resolution. For example to reduce from the SXGA resolution to the VGA resolution, pixel data from every other row and column are sampled to decrease resolution by half. The resolution may be reduced further when pixels are sampled for larger intervals of rows and columns for decreasing the quantity of processed data. However, such reduced data processing results in aliasing noise with slanting lines appearing as zigzags on the display.

To remove such aliasing noise, various attempts to average the image signals are being developed. Particularly, image signals from two rows for a same color filter may be vertically averaged. However, the frame rate cannot be increased with such vertical averaging when the two rows are selected separately.

Thus, vertical averaging may be performed with the two rows being selected simultaneously to increase the frame rate. In that case, the sub-sampling operation is acceptable when a difference between the two image signals to be averaged is small. However, when the difference is not small, the larger signal dominates to deteriorate image quality. For example, a bright line included in a dark image may not be displayed.

SUMMARY OF THE INVENTION

Accordingly, an image sensor of the present invention performs vertical averaging with two rows being simultaneously selected but without deteriorated image quality.

An image sensor according to a general aspect of the present invention includes first and second pixel circuits and an output node coupled to the first and second pixel circuits. Furthermore, the image sensor includes a bias circuit for providing different biasing currents at the output node for different modes of operation of the image sensor.

For example, the bias circuit provides a higher bias current at the output node during a sub-sampling mode of operation of the image sensor. During such a sub-sampling mode of operation, the output node generates an average reset signal from reset signals generated by the first and second pixel circuits, and generates an average image signal from image signals generated by the first and second pixel circuits.

In an example embodiment of the present invention, the first pixel circuit generates a first image signal indicating light intensity detected at a first photodiode within the first pixel circuit, and the second pixel circuit generates a second image signal indicating light intensity detected at a second photodiode within the second pixel circuit.

In another example embodiment of the present invention, the bias circuit includes a current mirror having a first transistor coupled to the output node. The bias circuit also includes at least two other transistors coupled to the first transistor for determining the bias current flowing through the first transistor.

In a further embodiment of the present invention, the bias circuit further includes a current source and a respective switch coupled between the current source and each of the at least two other transistors that are each diode-connected. In addition, the bias circuit includes a register for providing a respective control signal that determines whether each switch is turned on or off.

In an example embodiment of the present invention, fewer switches are turned on for increasing the bias current flowing through the first transistor during the sub-sampling mode of operation. In another embodiment of the present invention, the at least two other transistors have different W/L (width to length) ratios.

In a further embodiment of the present invention, the bias circuit provides a lower bias current at the output node during a normal mode of operation of the image sensor when one of the first and second pixel circuits is de-activated.

In an example embodiment of the present invention, the first and second pixel circuits are for pixels of nearest same color in a same column of an active pixel sensor array of the image sensor.

The present invention may be used to particular advantage when the image sensor is for a CIS-type (CMOS image sensor type) with each of the first and second pixel circuits including a photo-diode, a reset transistor, a transfer transistor, a row select transistor, and a source follower transistor.

In this manner, the bias current coupled to the output node for vertical averaging during the sub-sampling mode of operation is increased. Such increased bias current results in enhanced image quality even when the difference between the image signals to be averaged is large.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, and 9 refer to elements having similar structure and/or function.

DETAILED DESCRIPTION OF THE INVENTION

Figure 4:
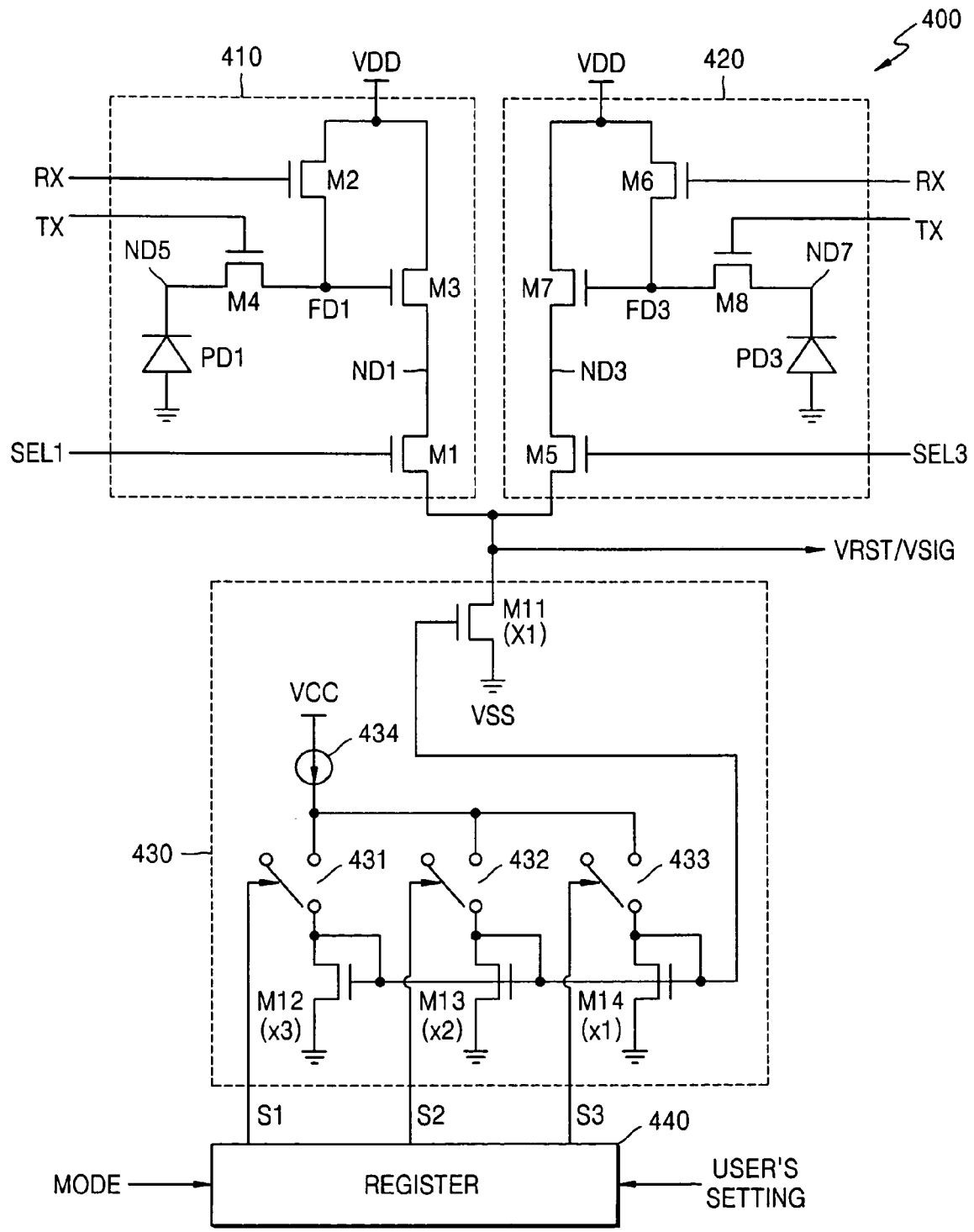
FIG. 4 is a block diagram of an image sensor with enhanced sub-sampling according to an embodiment of the present invention.

FIG. 4 is a block diagram of a CMOS (complementary metal oxide semiconductor) image sensor 400 according to an embodiment of the present invention. Referring to FIG. 4, the CMOS image sensor 400 includes a first pixel circuit 410 and a second pixel circuit 420. The first and second pixel circuits 410 and 420 are part of an APS (active pixel sensor) array having a plurality of pixels. The CMOS image sensor 400 further includes a bias circuit 430 for biasing an output node VRST/VSIG of the pixel circuits 410 and 420, and a register 440 for controlling the bias circuit 430.

Figure 2:
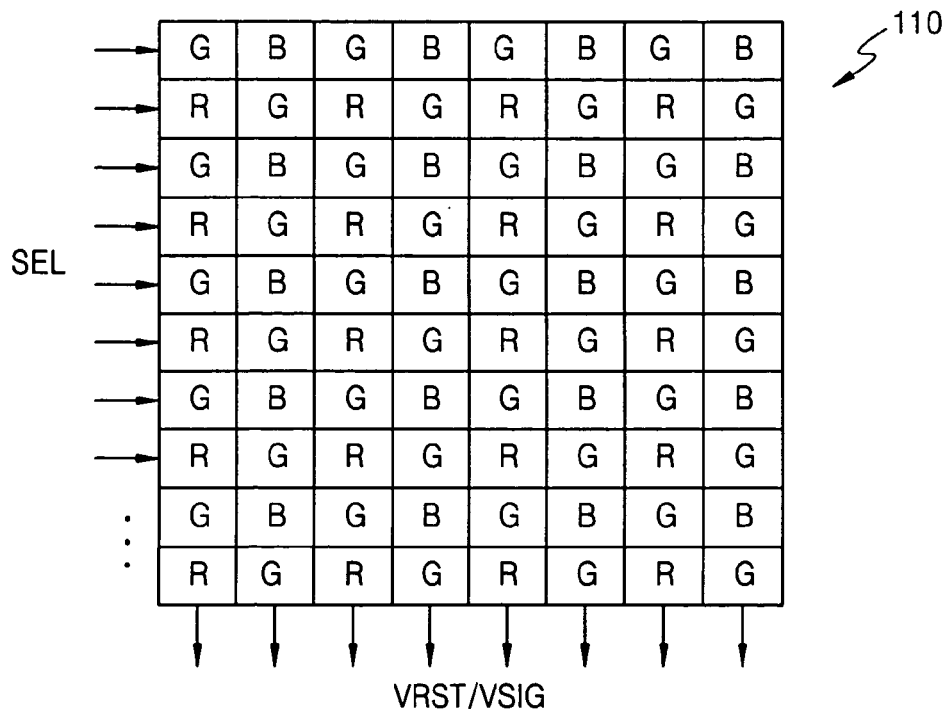
FIG. 2 illustrates a Bayer color filter pattern of the APS array of FIG. 1, as known in the prior art.
Figure 3:
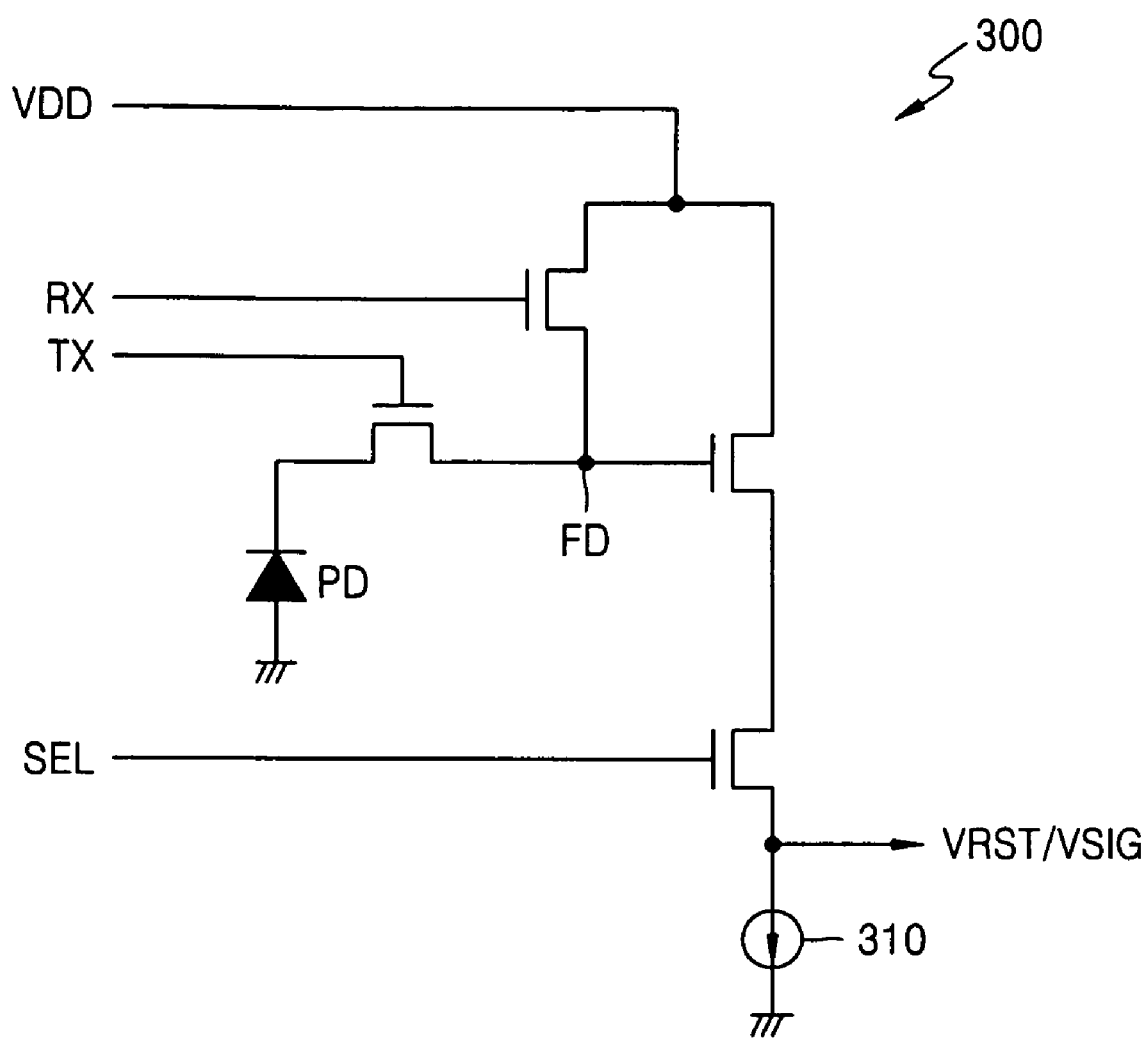
FIG. 3 is a circuit diagram of a typical pixel driving circuit for the APS array of FIG. 1, as known in the prior art.

The APS array of the CMOS image sensor 400 includes a plurality of pixels arranged in an array of rows and columns. FIG. 4 illustrates just two example pixel circuits 410 and 420 corresponding to two pixels having color filters for a same color along a same column in the vertical direction of the APS array. The APS array of the CMOS sensor has the Bayer color pattern (as shown in FIG. 2), in one embodiment of the present invention.

For example with such a Bayer color pattern, the first pixel circuit 410 is for a G(R/B) pixel in a first row of the APS array, and the second pixel circuit 420 is for a G(R/B) pixel in the third row of the APS array. In any case, the pixel circuits 410 and 420 are disposed along the same column in the array of pixels.

Figure 1:
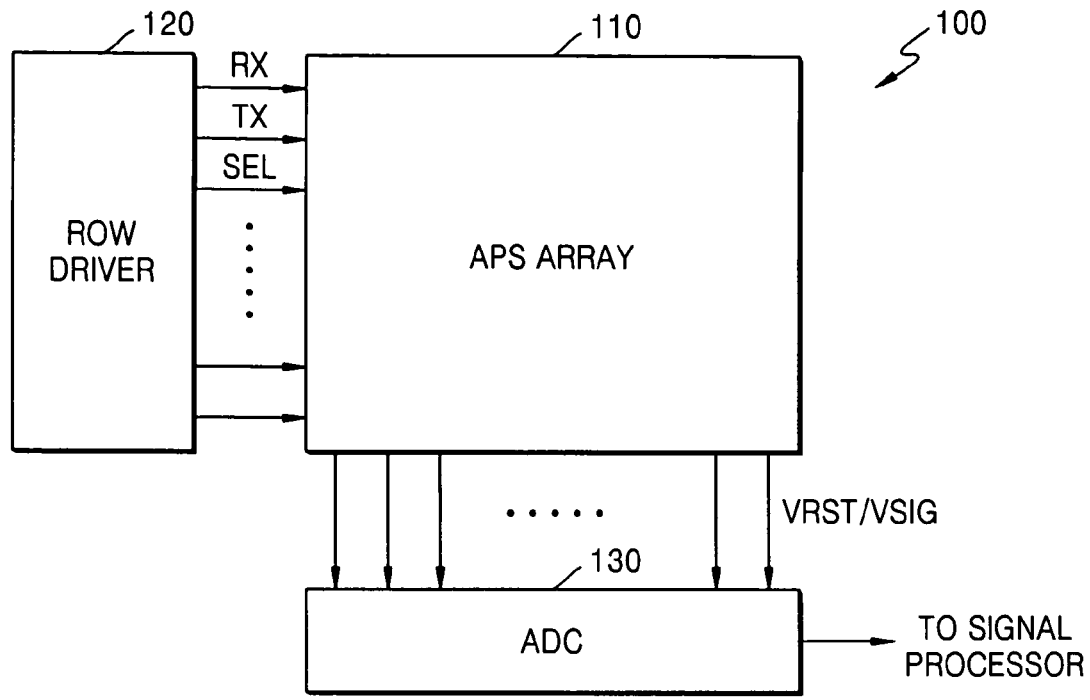
FIG. 1 is a block diagram of a conventional image sensor.

The bias circuit 430 and the register 440 may be disposed above or below the APS array. The CMOS image sensor 400 may also include a row driver and an analog-to-digital converter, similar to the image sensor 100 of FIG. 1. In that case, such a row driver (not shown) would generate row select signals SEL1, SEL3, . . . , reset control signals RX, and transfer control signals TX shown in FIG. 4. The analog-to-digital converter (not shown) would receive an averaged analog reset signal VRST and an averaged image signal VSIG output from the output node VRST/VSIG of the image sensor 400 for conversion into digital signals.

Referring to FIG. 4, each of the pixel circuits 410 and 420 includes a respective row select transistor M1/M5, a respective reset transistor M2/M6, a respective source follower transistor M3/M7, a respective transfer transistor M4/M8, and a respective photodiode PD1/PD3. While these transistors are shown as NMOSFETs (N-channel metal oxide semiconductor field effect transistors) in FIG. 4, the present invention may be implemented with different types of transistors.

Each row select transistor M1/M5 has a gate with a respective row select signal SEL1/SEL3 applied thereon. A drain/source of each row select transistor M1/M5 is coupled to a respective node ND1/ND3, while the other drain/source is coupled to the output node VRST/VSIG.

Each reset transistor M2/M6 has a gate with the reset control signal RX applied thereon. A drain/source of each reset transistor M2/M6 is coupled to a power source VDD, and the other drain/source is coupled to a respective FD (floating diffusion) node FD1/FD3. Each source follower transistor M3/M7 has a gate coupled to the respective FD node FD1/FD3. A drain/source of each source follower transistor M3/M7 is coupled to the power source VDD, and the other drain/source is coupled to the respective node ND1/ND3.

Each transfer transistor M4/M8 has a gate having the transfer control signal TX applied thereon. A drain/source of each transfer transistor M4/M8 is coupled to the respective FD node FD1/FD3, and the other drain/source is coupled to a respective node ND5/ND7. The respective photodiode PD1/PD3 in each of the pixel circuits 410 and 420 performs photoelectric conversion between a power source VSS (for example, ground) and the respective node ND5/ND7.

The bias circuit 430 includes a current source 434, a plurality of switches 431, 432, and 433, a first transistor M11, and a plurality of other transistors M12, M13 and M14. Such transistors M11, M12, M13, and 14 are shown as NMOSFETs in FIG. 4, but the present invention may be practiced with different types of transistors.

The current source 434 is coupled to a power source VCC to generate a predetermined current level. Each of the switches 431, 432, and 433 is coupled between the current source 434 and a drain of a respective one of the transistors M12, M13 and M14 having a source coupled to the ground node (or a low power source VSS). A respective one of the control signals S1, S2 and S3 from the register 440 determines whether each of the switches 431. 432 and 433 is turned on (i.e., closed) or turned off (i.e., open).

Each of the transistors M12, M13 and M14 is diode connected with a drain being coupled to a gate. The gates of the transistors M12, M13 and M14 are coupled together to the gate of the transistor M11 having a drain coupled to the output node VRST/VSIG and a source coupled to the ground node (or a low power source VSS). In this manner, the transistor M11 forms a current mirror with any of the transistors M12, M13, and M14 coupled to the current source 434 when any of the switches 431, 432 and 433 is closed.

The transistors M12, M13 and M14 may be formed with a same size (i.e., a same W/L, width to length ratio). Alternatively, in a preferred embodiment of the present invention, the transistors M12, M13 and M14 have different width-to-length ratios W/L. For example, when the transistor M14 has a W/L ratio of 1, the transistors M12 and M13 have W/L ratios of 3 and 2, respectively.

The register 440 generates the switch control signals S1, S2, and S3 in response to a mode signal MODE indicating the mode of operation of the image sensor 400. For example, the mode signal MODE indicates whether the image sensor 400 operates in a normal mode or a sub-sampling mode. The register 400 provides the switch control signals S1, S2, and S3 to the plurality of switches 431, 432, and 433, respectively depending on the MODE signal.

In the normal mode of operation, pixels in a row direction of the APS array in the image sensor 400 are sequentially selected. Thus, just one of the pixel circuits 410 and 420 would be activated in the normal mode of operation. A pixel circuit is activated when the corresponding row select transistor M1/M5 is turn on and is deactivated when the corresponding row select transistor M1/M5 is turn off.

In the sub-sampling mode of operation, however, pixels with color filters of the same color in a vertical direction in a same column are simultaneously selected. For example, the pixel circuits 410 and 420 of FIG. 4 are simultaneously activated in the sub-sampling mode of operation.

Figure 5:
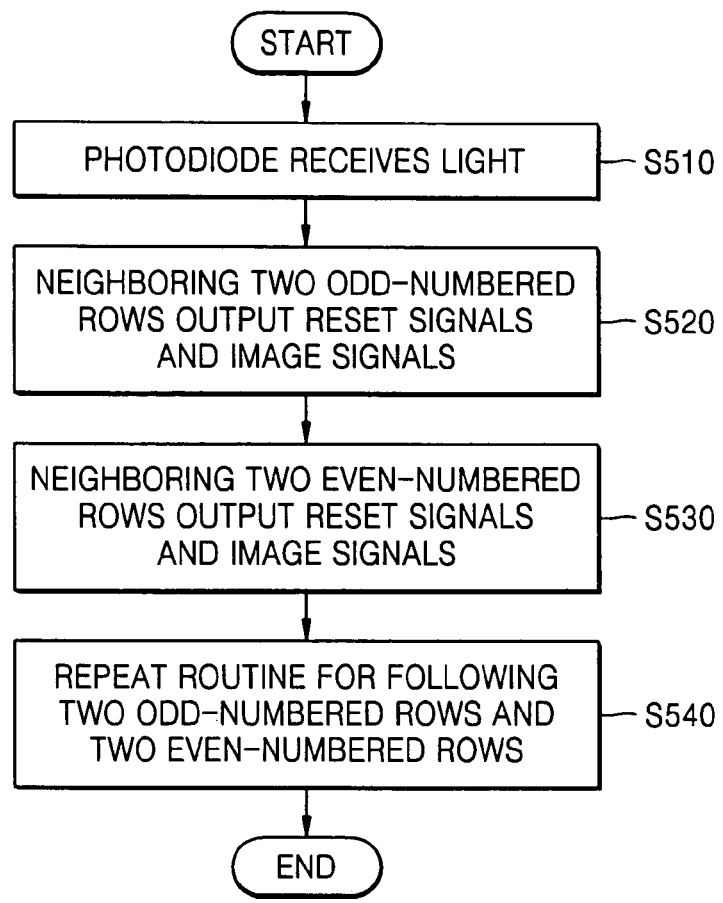
FIG. 5 is a flow chart of steps during operation of the image sensor of FIG. 4, according to an embodiment of the present invention.
Figure 6:
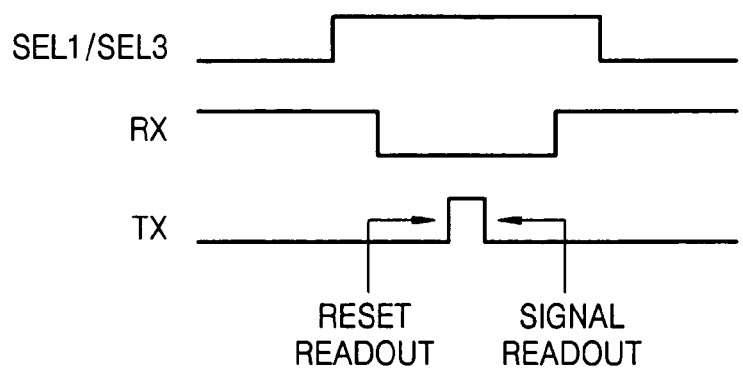
FIG. 6 is a timing diagram of signals during operation of the image sensor of FIG. 4, according to an embodiment of the present invention.

The sub-sampling mode of operation of the image sensor 400 of FIG. 4 is now explained in more detail in reference to FIGS. 5 and 6. FIG. 5 shows steps of operation and FIG. 6 is a timing diagram of signals during the sub-sampling mode of operation of the image sensor of FIG. 4.

Referring to FIG. 5, each of the photodiodes PD1 and PD3 in the pixel circuits 410 and 420 receives respective external light for photoelectric-conversion (step 510 of FIG. 5) before the transfer control signal TX is activated to a logic high level. Referring to FIGS. 5 and 6, the row select signals SEL1 and SEL3 are activated to the logic high level for the sub-sampling mode of operation. Thus, corresponding pixel circuits in odd-numbered rows (first and third rows, for example) of the APS array are activated.

Referring to FIGS. 4, 5, and 6, when the row select signals SEL1 and SEL3 are activated to the logic high level, the row select transistors M1 and M5 are simultaneously turned on for generating an average reset signal VRST and an average image signal VSIG from the two pixel circuits 410 and 420 (step S520 of FIG. 5). Specifically, the power source voltage VDD is transmitted to the FD nodes FD1 and FD3 before the reset control signal RX is activated to a low level.

Thereafter, when the reset control signal RX is activated to the low level, the voltages at the FD nodes FD1 and FD3 are transferred to the output node VRST/VSIG via the source follower transistors M3 and M7 and the row select transistors M1 and M5. As a result, the average reset signal VRST is generated at the output node VRST/VSIG from an average of the reset signals transferred from the FD nodes FD1 and FD3.

Thereafter, the transfer control signal TX is activated to a high level. As a result, image signals photoelectric-converted by the photodiodes PD1/PD3 are each transferred to the respective FD nodes FD1 and FD3. Subsequently, the transfer control signal TX is deactivated to a low level, and the image signals are transferred from the FD nodes FD1 and FD3 to the output node VRST/VSIG via the source follower transistors M3 and M7 and the row select transistors M1 and M5. As a result, the average image signal VSIG is generated at the output node VRST/VSIG from an average of the image signals transferred from the FD nodes FD1 and FD3.

Such average reset and image signals VRST and VSIG are further processed by the analog-to-digital converter for example. After such average reset and image signals of the pixels for the odd-numbered rows (first and third rows, for example) are generated, subsequent average reset and image signals for corresponding even-numbered rows (second and fourth rows, for example) are similarly generated (step S530 of FIG. 5). Subsequent pairs of odd-numbered rows and even-numbered rows are alternately selected for generating corresponding average reset and image signals for all rows in the APS array (step S540 of FIG. 5).

In an embodiment of the present invention, the bias circuit 430 generates a bias current provided at the output node VRST/VSIG (through the transistor M11) that is larger in the sub-sampling mode of operation than in the normal mode of operation. For example, the register 440 generates the switch control signals S1, S2 and S3 that turn on all the switches 431, 432 and 433 when the mode signal MODE indicates the normal mode of operation. In that case, because the predetermined current level from the current source 434 flows through all of the transistors M12, M13, and M14, the gate to source voltage of the transistor M11 is reduced for in turn decreasing the current flowing through the transistor M11.

On the other hand, when the mode signal MODE indicates the sub-sampling mode of operation, the register 440 generates the switch control signals S1, S2 and S3 to turn on only one of the plurality of switches 431, 432 and 433. Because the predetermined current level flows through just one of the transistors M12, M13 and M14, the gate to source voltage of the transistor M11 is increased for in turn increasing the current flowing through the transistor M11.

The current through the transistor M11 is determined by the W/L ratios of the transistors M11, M12, M13, and M14, and by selecting which one of the transistors M12, M13, and M14 are coupled to the current source 434 with the switch control signals S1, S2, and S3. Generally, fewer of the transistors M12, M13, and M14 being coupled to the current source 434 results in higher bias current flowing through the transistor M11 and provided at the output node VRST/VSIG.

In an alternative embodiment of the present invention, a user may set each of the switch control signals S1, S2 and S3 in the register 430 for setting the bias current flowing through the transistor M11 and provided at the output node VRST/VSIG.

Figure 7:
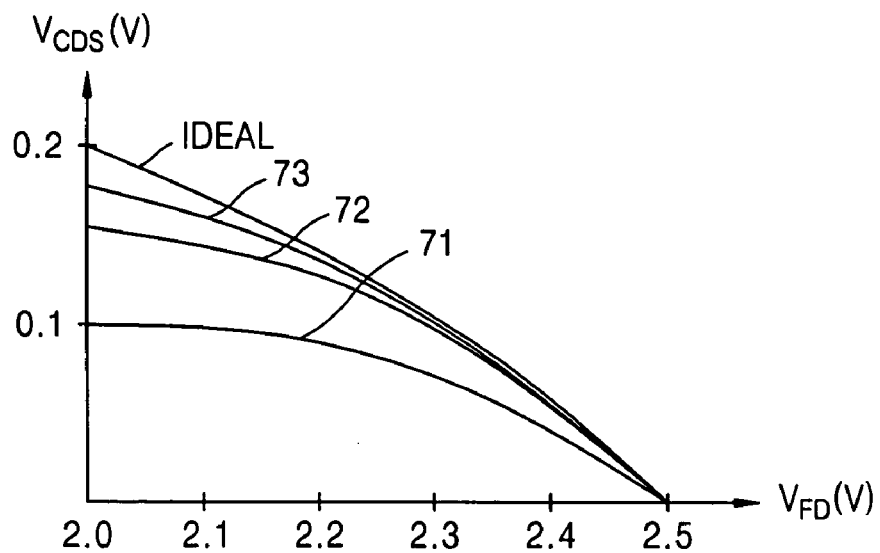
FIG. 7 shows graphs of a relationship between a voltage variation at a floating diffusion node FD3 in FIG. 4 and a CDS circuit output voltage.

FIG. 7 shows graphs of a relationship between a variation in the voltage $V_{FD}$ of the node FD3 in FIG. 4 and a CDS (correlated double sampling) circuit output voltage. For conducting an experiment of the worst case scenario, the voltage of the node FD1 in FIG. 4 is set to a voltage of the darkest case, that is, a reset voltage (VDD=2.5V).

As shown in FIG. 7, curves 71, 72, and 73 become similar to an ideal curve when the voltage $V_{FD}$ at the node FD3 is close to the reset voltage VDD (2.5 Volts). However, such curves 71, 72, and 73 deviate more from the ideal curve when the voltage $V_{FD}$ at the node FD3 decreases. A curve 71 is obtained when the bias current flowing through the transistor M11 is at a lowest level. A curve 72 is obtained when the bias current flowing through the transistor M11 is at a medium level (such as twice that used in the case of curve 71). A curve 73 is obtained when the bias current flowing through the transistor M11 is at a highest level (such as three-times that used in the case of curve 71). The curve 73 with the highest current level is closest to the ideal curve in FIG. 7.

Figure 8:
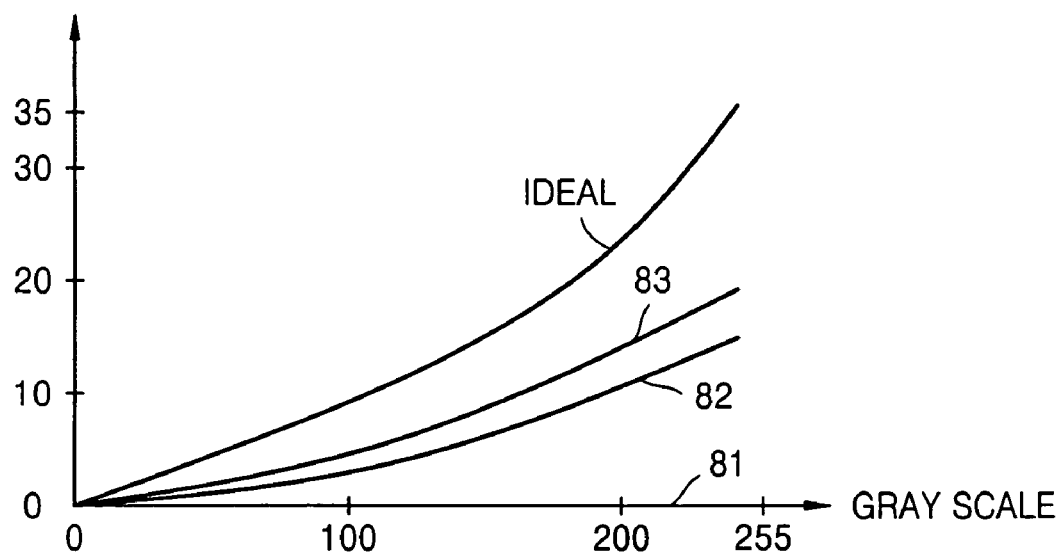
FIG. 8 shows graphs of a relationship between a gray scale and an output code difference according to the result of FIG. 7.

FIG. 8 shows graphs of the relationship between a gray scale and an output code difference based on the result of FIG. 7, assuming that a saturation voltage of the photodiode PD1/PD3 is 300 mV in an 8-bit pixel gray scale system. A curve 81 in FIG. 8 corresponds to the curve 71 in FIG. 7; a curve 82 in FIG. 8 corresponds to the curve 72 in FIG. 7; and a curve 83 in FIG. 8 corresponds to the curve 73 in FIG. 7. In FIG. 8, the curve 83 for the case of the highest bias current at the output node VRST/VSIG is closest to the ideal curve. Given an acceptable code error for the photodiode PD1/PD3, a user may set the control signals S1, S2, and S3 in the register 440 for operation of the image sensor within the acceptable code error.

Figure 9:
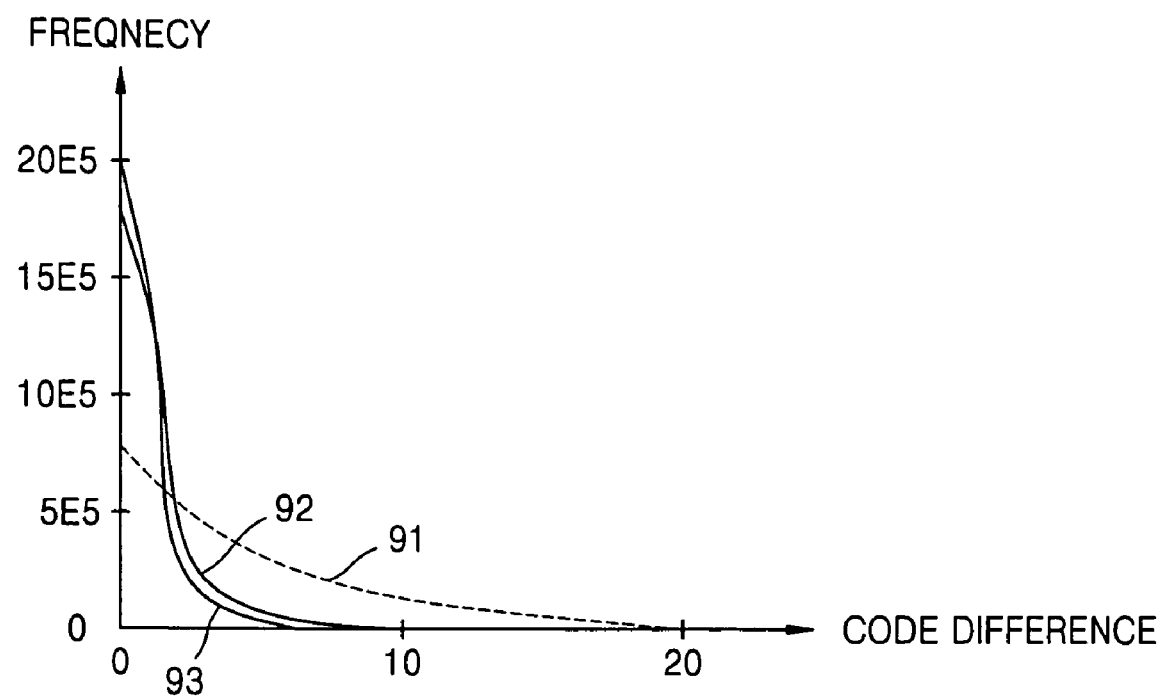
FIG. 9 shows graphs of a relationship between an output code difference and pixel frequency according to the result of FIG. 7.

FIG. 9 shows graphs of a relationship between an output code difference and pixel frequency based on the curves of FIG. 7. A curve 91 in FIG. 9 corresponds to the curve 71 in FIG. 7; a curve 92 in FIG. 9 corresponds to the curve 72 in FIG. 7; and a curve 93 in FIG. 9 corresponds to the curve 73 in FIG. 7. Such curves illustrate that the frequency of the larger code error is decreased as the bias current at the output node VRST/VSIG is increased.

In this manner during the sub-sampling mode of operation, the image sensor 400 processes image signals at twice the reading rate from the normal mode of operation with vertical averaging. Furthermore, the bias current at the output node VRST/VSIG is increased during the sub-sampling mode of operation for improved image quality even for a large difference between image signals to be averaged.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, any number of elements, or type of devices, or timing diagrams of signals illustrated and described herein are by way of example only. The present invention is limited only as defined in the following claims and equivalents thereof.

What is claimed is:

1. An image sensor comprising:
   a first pixel circuit and a second pixel circuit;
   an output node coupled to the first and second pixel circuits; and
   a bias circuit for providing different biasing currents at the output node for different modes of operation of the image sensor,
   wherein the output node has generated thereon a respective reset signal and a respective image signal for each of the first and second pixel circuits.

2. The image sensor of claim 1, wherein the bias circuit provides a higher bias current at the output node during a sub-sampling mode of operation of the image sensor.

3. The image sensor of claim 2, wherein the output node generates an average reset signal from reset signals generated by the first and second pixel circuits, and generates an average image signal from image signals generated by the first and second pixel circuits, during the sub-sampling mode of operation.

4. The image sensor of claim 3, wherein the first pixel circuit generates a first image signal indicating light intensity detected at a first photodiode within the first pixel circuit, and wherein the second pixel circuit generates a second image signal indicating light intensity detected at a second photodiode within the second pixel circuit.

5. The image sensor of claim 2, wherein the bias circuit includes a current mirror having:
   a first transistor coupled to the output node; and
   at least two other transistors coupled to the first transistor for determining the bias current flowing through the first transistor.

6. The image sensor of claim 5, wherein the bias circuit further includes:
   a current source; and
   a respective switch coupled between the current source and each of the at least two other transistors that are each diode-connected;
   and wherein the image sensor further includes:
   a register for providing a respective control signal that determines whether each switch is turned on or off.

7. The image sensor of claim 6, wherein fewer switches are turned on for increasing the bias current flowing through the first transistor during the sub-sampling mode of operation.

8. The image sensor of claim 6, wherein the respective control signal is set by the register in response to a mode signal indicating the mode of operation of the image sensor.

9. The image sensor of claim 6, wherein the at least two other transistors have different W/L (width to length) ratios.

10. The image sensor of claim 2, wherein the bias circuit provides a lower bias current at the output node during a normal mode of operation of the image sensor when one of the first and second pixel circuits is de-activated.

11. The image sensor of claim 2, wherein the first and second pixel circuits are for pixels of nearest same color in a same column of an active pixel sensor array of the image sensor.

12. The image sensor of claim 1, wherein the image sensor is for a CIS-type (CMOS image sensor type) with each of the first and second pixel circuits including a photo-diode, a reset transistor, a transfer transistor, a row select transistor, and a source follower transistor.

13. An image sensor comprising:
   a first pixel circuit and a second pixel circuit;
   an output node coupled to the first and second pixel circuits; and means for providing different biasing currents at the output node for different modes of operation of the image sensors,
wherein the output node has generated thereon a respective reset signal and a respective image signal for each of the first and second pixel circuits.

14. The image sensor of claim 13, wherein the means provides a higher bias current at the output node during a sub-sampling mode of operation of the image sensor, and the means provides a lower bias current at the output node during a normal mode of operation of the image sensor when one of the first and second pixel circuits is de-activated.

15. The image sensor of claim 14, wherein the output node generates an average reset signal from reset signals generated by the first and second pixel circuits, and generates an average image signal from image signals generated by the first and second pixel circuits, during the sub-sampling mode of operation.

16. The image sensor of claim 15, wherein the first and second pixel circuits are for pixels of nearest same color in a same column of an active pixel sensor array of the image sensor.

17. A method for driving an image sensor comprising:
activating at least one of first and second pixel circuits coupled to an output node for generating reset and image signals at the output node; and
providing different biasing currents at the output node for different modes of operation of the image sensors,
wherein the output node has generated thereon a respective reset signal and a respective image signal for each of the first and second pixel circuits.

18. The method of claim 17, wherein a higher bias current is provided at the output node during a sub-sampling mode of operation of the image sensor when the first and second pixels are activated.

19. The method of claim 17, wherein a lower bias current is provided at the output node during a normal mode of operation of the image sensor when one of the first and second pixel circuits is de-activated.

20. The method of claim 17, wherein the first and second pixel circuits are for pixels of nearest same color in a same column of an active pixel sensor array of the image sensor.

* * * * *